(12) United States Patent
Furukawa

(10) Patent No.: US 10,862,707 B2
(45) Date of Patent: Dec. 8, 2020

(54) NETWORK SYSTEM, NODE, FRAME COMMUNICATION METHOD, AND PROGRAM

(71) Applicant: PicoCELA Inc., Tokyo (JP)

(72) Inventor: Hiroshi Furukawa, Tokyo (JP)

(73) Assignee: PicoCELA, Inc., Tokyo (JP)

( * ) Notice: Subject to any disclaimer, the term of this patent is extended or adjusted under 35 U.S.C. 154(b) by 108 days.

(21) Appl. No.: 15/772,555

(22) PCT Filed: Nov. 1, 2016

(86) PCT No.: PCT/JP2016/082489
§ 371 (c)(1),
(2) Date: May 1, 2018

(87) PCT Pub. No.: WO2017/078028
PCT Pub. Date: May 11, 2017

(65) Prior Publication Data
US 2018/0332616 A1 Nov. 15, 2018

(30) Foreign Application Priority Data

Nov. 2, 2015 (JP) ................................. 2015-216046

(51) Int. Cl.
*H04L 12/44* (2006.01)
*H04W 74/04* (2009.01)
(Continued)

(52) U.S. Cl.
CPC ............. *H04L 12/44* (2013.01); *H04W 74/04* (2013.01); *H04W 16/22* (2013.01); *H04W 24/06* (2013.01);
(Continued)

(58) Field of Classification Search
CPC ...... H04L 12/44; H04W 74/04; H04W 24/06; H04W 40/24; H04W 40/14; H04W 28/14;
(Continued)

(56) References Cited

U.S. PATENT DOCUMENTS 8,370,894 B2 * 2/2013 Costa ...................... H04L 63/20
726/1
8,406,139 B2 * 3/2013 Frei ........................ H04J 3/0655
370/238
(Continued)

FOREIGN PATENT DOCUMENTS

| JP | 4496336 B2 | 7/2010 |
| JP | 5515072 B2 | 6/2014 |

OTHER PUBLICATIONS

Akashi et al., "On Data Transmission Method and Scheduling of the Time Division Asymmetric Wireless Multi-hop Access Network", "Multimedia, Distributed, Cooperative, and Mobile (DICOMO2008) Symposium", Jul. 2008.
(Continued)

*Primary Examiner* — Brian T O Connor
(74) *Attorney, Agent, or Firm* — Brundidge & Stanger, P.C.

(57) ABSTRACT

The present invention proposes a network system, etc., that are suitable for improving the communication efficiency of an entire network even when a CSMA, etc., are adopted. A network system for transmitting uplink/downlink traffics using a route having a tree structure with a root node, a plurality of inner nodes, and a plurality of leaf nodes, wherein the root node transmits a downlink frame to the inner nodes and leaf nodes at intervals equal to or greater than an additional wait time differing for each destination node. The root node transmits a downlink frame at, for example, an interval consisting of the additional wait time plus a quality assurance time for assuring communication
(Continued)

quality. An interval which is a varying time interval but equal to the additional wait time at the least is assured, whereby the communication efficiency of an entire network is improved.

11 Claims, 8 Drawing Sheets

(51) Int. Cl.
| | |
|---|---|
| *H04W 84/22* | (2009.01) |
| *H04W 16/22* | (2009.01) |
| *H04W 40/08* | (2009.01) |
| *H04W 84/18* | (2009.01) |
| *H04W 28/14* | (2009.01) |
| *H04W 40/14* | (2009.01) |
| *H04W 40/24* | (2009.01) |
| *H04W 24/06* | (2009.01) |

(52) U.S. Cl.
CPC ............ *H04W 28/14* (2013.01); *H04W 40/08* (2013.01); *H04W 40/14* (2013.01); *H04W 40/24* (2013.01); *H04W 84/18* (2013.01); *H04W 84/22* (2013.01)

(58) Field of Classification Search
CPC ..... H04W 84/18; H04W 40/08; H04W 16/22; H04W 84/22
See application file for complete search history.

(56) References Cited

U.S. PATENT DOCUMENTS

| | | | | |
|---|---|---|---|---|
| 8,693,366 | B2* | 4/2014 | Furukawa | H04W 40/08 |
| | | | | 370/252 |
| 8,792,378 | B2* | 7/2014 | Chang | H04W 72/085 |
| | | | | 370/252 |
| 9,363,732 | B2* | 6/2016 | Turon | H04W 76/10 |
| 9,648,612 | B2* | 5/2017 | Sridharan | H04W 72/0446 |
| 9,948,516 | B2* | 4/2018 | Turon | H04W 76/10 |
| 10,362,618 | B2* | 7/2019 | Shirai | H04W 84/12 |
| 2003/0189948 | A1 | 10/2003 | Sashihara | |
| 2011/0110233 | A1 | 5/2011 | Furukawa | |
| 2012/0177057 | A1* | 7/2012 | Hemli | H04L 45/48 |
| | | | | 370/406 |
| 2013/0254426 | A1* | 9/2013 | Vaswani | G01D 4/004 |
| | | | | 709/242 |
| 2016/0294622 | A1* | 10/2016 | Phillips | H04L 41/0816 |
| 2017/0085433 | A1* | 3/2017 | Kato | H04L 12/46 |
| 2017/0164264 | A1* | 6/2017 | Kato | H04W 28/14 |
| 2019/0312632 | A1* | 10/2019 | Chang | H04W 72/1205 |

OTHER PUBLICATIONS

Akashi et al., "On Data Transmission Method and Scheduling of the Time Division Asymmetric Wireless Multi-hop Access Network", "Multimedia, Distributed, Cooperative, and Mobile (DICOM02008) Symposium", Jul. 2008.
International Search Report from International Application No. PCT/JP2016/082489 dated Jan. 31, 2017.
The extended European search report dated Mar. 20, 2019 for European Application No. 16862088.8.

* cited by examiner

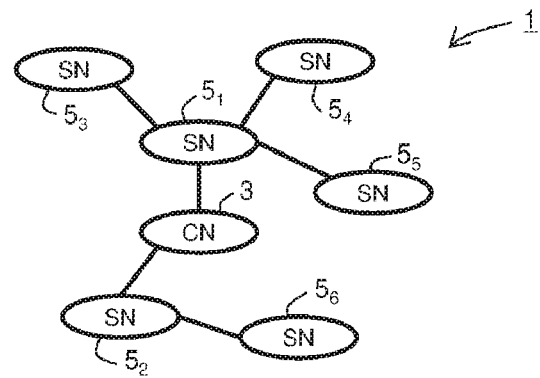
FIG. 1
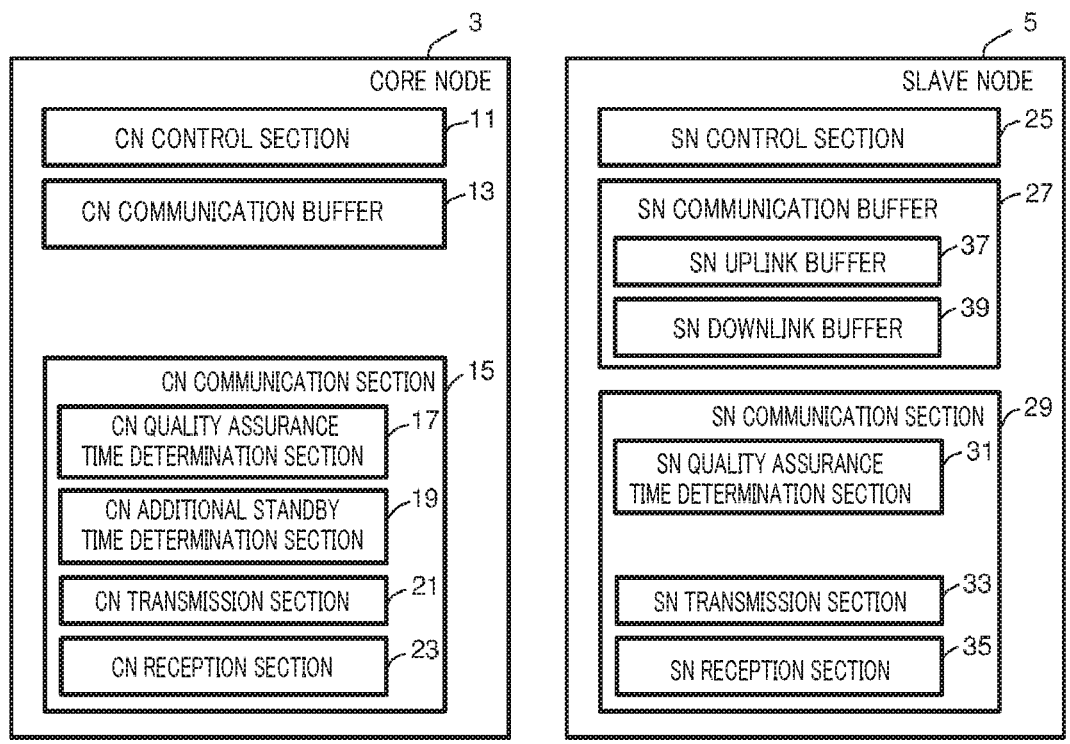
FIG. 2A
FIG. 2B

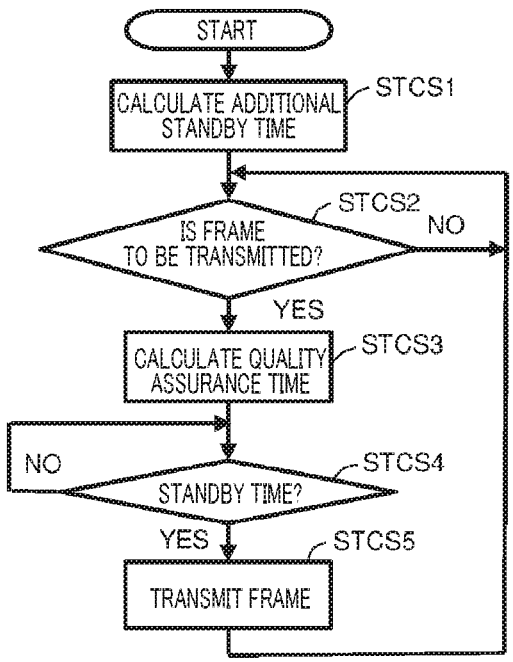
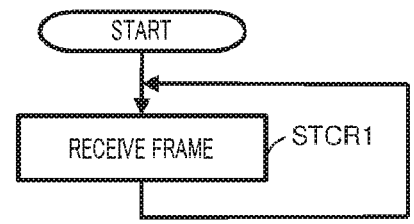
FIG. 3A  FIG. 3B
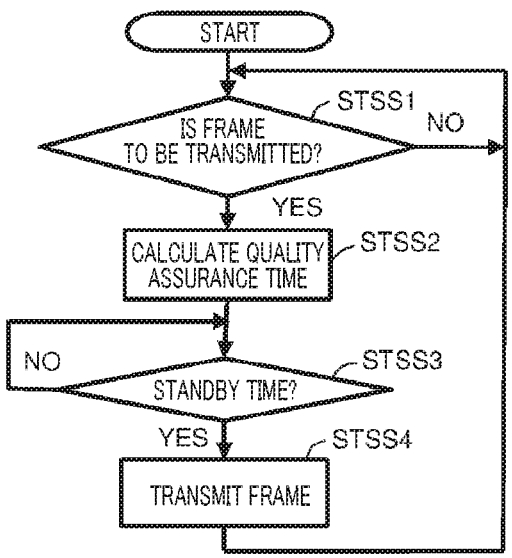
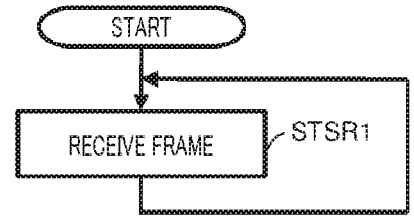
FIG. 3C  FIG. 3D

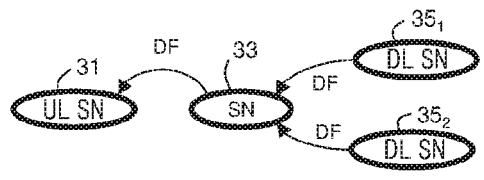
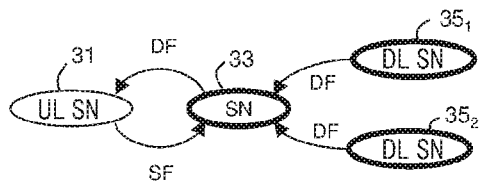
FIG. 10A FIG. 10B
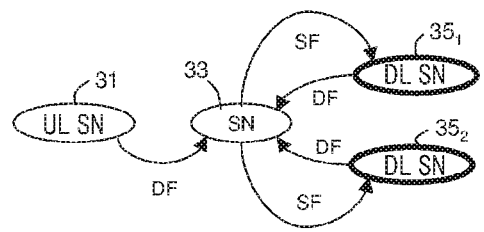
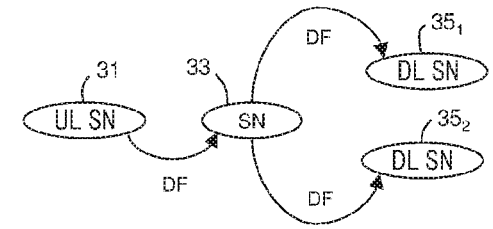
FIG. 10C FIG. 10D
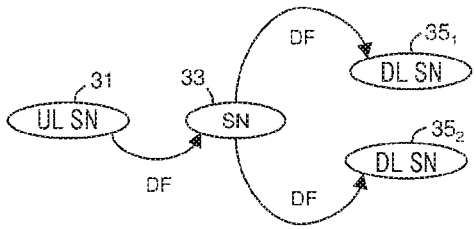
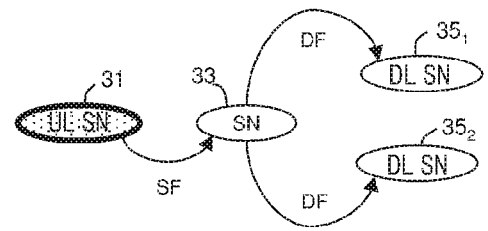
FIG. 11A FIG. 11B
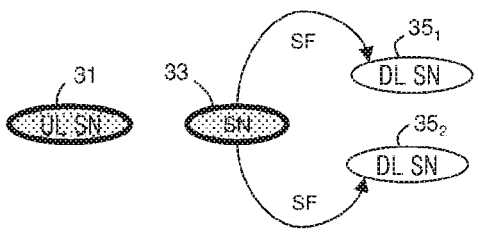
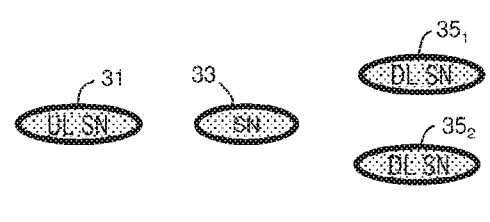
FIG. 11C FIG. 11D

NETWORK SYSTEM, NODE, FRAME COMMUNICATION METHOD, AND PROGRAM

TECHNICAL FIELD

The present invention relates to a network system, a node, a frame communication method, and a program, and in particular, to a network system and the like including multiple nodes.

BACKGROUND ART

For example, the CSMA/CA protocol and the like automatically stand by in order to prevent multiple communication apparatuses from simultaneously performing transmission, and subsequently, comes into a transmissible state and performs transmission. In general, the standby time is randomly provided.

The inventor has proposed that in a wireless multihop network system including one core node (a gateway node connected to a backbone link) and multiple slave nodes, the core node periodically performs intermittent transmission in order to improve the communication efficiency of the entire network, thereby improving the communication efficiency of the entire network (intermittent periodic transmission (IPT)). Furthermore, a method of efficiently transmitting uplink and downlink traffic while suppressing the radio wave interference has been proposed (see, for example, Patent Literature 1). For example, PTL 1 describes a method of avoiding the radio wave interference and a packet collision between the uplink and downlink by separately using the uplink and downlink through a multichannel to thereby avoid the radio wave interference and packet collision between the uplink and downlink.

NPL 1 describes a wireless multihop scheme that defines a high-output AP capable of making radio waves reach all the other nodes in order to suppress the radio wave interference of the uplink and downlink traffic in a wireless multihop network system defined as AWiMA Net, adopts the high-output AP as a mediator, indicates all the other nodes on an uplink data process period and a downlink data process period, and suppresses the radio wave interference between the uplink and downlink. Furthermore, it is described that in a case of achievement through multiple high-output APs, a cooperative process between these APs is performed.

CITATION LIST

Patent Literature

PTL 1
Japanese Patent No. 5515072

Non Patent Literature

NPL 1
Akashi et al. "On Data Transmission Method and Scheduling of the Time Division Asymmetric Wireless Multi-hop Access Network", "Multimedia, Distributed, Cooperative, and Mobile (DICOMO2008) Symposium", July 2008.

SUMMARY OF INVENTION

Technical Problem

In a case where CSMA/CA or the like is adopted as the wireless IF of the core node, a standby time period is automatically added. However, this case is for direct communication from the core node, and is of random backoff. Accordingly, the efficiency is low, and the communication efficiency of the entire network is not improved.

For example, the method described in Patent Literature 1 can separately use the uplink and downlink through two or more wireless modules. However, the method requires the multiple modules. Accordingly, there is a problem in that the cost of the apparatus is high. In the case where the multiple wireless modules are used and these wireless modules are exclusively allocated to the uplink and downlink as described above, a channel division loss occurs. PTL 1 (see paragraph 0067 in Description and the like) describes that to suppress such a loss, uplink traffic and downlink traffic are mixed in one channel (uplink and downlink mixed channel) among the channels. However, a specific method therefor is not clearly described. It is not difficult to imagine that if vehicles in both the directions try to travel simultaneously through a single lane road, a heavy traffic jam occurs. Likewise, the same phenomenon occurs in the uplink and downlink mixed channel. Hereinafter, this phenomenon is called a bi-directional collision.

Furthermore, there is another problem in that if the IPT according to the method described in PTL 1 is implemented in a wireless module equipped with a quality assurance function on a data link layer, such as CSMA/CA, a stochastic transmission standby time automatically added by the quality assurance function disturbs the transmission standby time required for IPT operation.

According to the background art described in NPL 1, AWiMA Net adopts communication schemes different between the uplink and downlink, and an AP controls all the terminals using downlink data being transmitted through a single hop communication. Accordingly, the communication control between the AP and the terminals described in NPL 1 is not applicable to the communication between multiple APs. A complicated cooperative process is performed between the multiple APs in order to prevent data collision and interference in an overlapping area.

Accordingly, an object of the invention of the present application is to propose a network system and the like that are suitable for improvement in the communication efficiency of the entire network even if the CSMA/CA or the like is adopted.

Solution to Problem

A first aspect of the invention of the present application is a network system, including: a plurality of nodes, in which the plurality of nodes transmit uplink and downlink traffic, using a path having a tree structure that includes one root node, a plurality of internal nodes, and a plurality of leaf nodes, in which the root node includes: a CN communication section that transmits a downlink frame to the plurality of internal nodes and the plurality of leaf nodes; and a transmission standby time determination section that determines a transmission standby time when the downlink frame is transmitted, in which: the transmission standby time determination section determines, as the transmission standby time, when the downlink frame is transmitted, a time that is equal to or longer than an additional standby time different for each destination node, and in a case where the root node transmits the downlink frame, the transmission standby time determination section determines the transmission standby time, and the CN communication section transmits the downlink frame after the transmission standby time elapses after transmission of a downlink frame that is immediately before the downlink frame to be transmitted.

A second aspect of the invention of the present application is the network system according to the first aspect, in which the transmission standby time determination section includes: a quality assurance time determination section that determines a quality assurance time for securing a communication quality with a next relay destination node when each of the downlink frames is transmitted; and an additional standby time determination section that determines the additional standby time different for each final destination node, in which the CN communication section transmits a next downlink frame after the quality assurance time and the additional standby time elapse after transmission of the downlink frame that is immediately before the next downlink frame.

A third aspect of the invention of the present application is the network system according to the second aspect, in which the root node is achieved by a plurality of layers, the quality assurance time determination section determines, as the quality assurance time, a time for securing the communication quality with the next relay destination node on a first layer, and the additional standby time determination section determines, as the additional standby time, a time to be added for securing the communication quality to a final relay destination node on a second layer that is different from the first layer.

A fourth aspect of the invention of the present application is the network system according to any one of the first to the third aspects, in which the plurality of internal nodes and the plurality of leaf nodes include: an SN quality assurance time determination section that determines a quality assurance time for securing the communication quality with a next relay destination node during transmission of a frame; and an SN communication section that transmits a next frame after the quality assurance time elapses after transmission of a frame that is immediately before the next frame.

A fifth aspect of the invention of the present application is the network system according to any one of the first to the fourth aspects, in which: the root node transmits an indication frame to the plurality of internal nodes and the plurality of leaf nodes along the path, the indication frame includes: an uplink direction indication frame for designating an uplink; and a downlink direction indication frame for designating a downlink, and the plurality of internal nodes and the plurality of leaf nodes comprise an SN communication section that communicates with another node, in which upon receipt of the uplink direction indication frame, in a case of the plurality of internal nodes, the SN communication section transfers the uplink direction indication frame in a downlink direction, and during communication until receipt of a new indication frame other than the uplink direction indication frame, the SN communication section receives the uplink data frame and the downlink data frame, and the indication frame, and transmits the uplink data frame and buffers the downlink data frame without transmitting the downlink data frame, and upon receipt of the downlink direction indication frame, in the case of the plurality of internal nodes, the SN communication section transfers the downlink direction indication frame in the downlink direction, and during communication until receipt of a new indication frame other than the downlink direction indication frame, the SN communication section receives the uplink data frame and the downlink data frame, and the indication frame, and transmits the downlink data frame and buffers the uplink data frame without transmitting the uplink data frame.

A sixth aspect of the invention of the present application is the network system according to the fifth aspect, in which the root node changes, according to a traffic amount and/or a buffer amount, a time allocation of a time from transmission of the uplink direction indication frame to transmission of a next indication frame and a time from transmission of the downlink direction indication frame to transmission of a next indication frame.

A seventh aspect of the invention of the present application is the network system according to the fifth or the sixth aspect, in which the indication frame further includes an access link indication frame, in which upon receipt of the access link indication frame, during communication until reception of a new indication frame other than the access link indication frame, in the case of the plurality of internal nodes, the SN communication section transfers the access link indication frame in the downlink direction, and receives the uplink data frame and the downlink data frame, and the indication frame, communicates with a communication apparatus other than the plurality of nodes, and buffers the downlink data frame and the uplink data frame without transmitting these buffered frames.

An eighth aspect of the invention of the present application is the network system according to any one of the first to the fourth aspects, in which the plurality of internal nodes comprise an SN communication section that transmits a polling frame to another node, in which the SN communication section comprises an uplink buffer and a downlink buffer, and the polling frame includes an uplink data frame or a downlink data frame, and a flag indicating uplink or downlink, in which the CN communication section included in the root node transmits the polling frame to a downlink node; upon receipt of the polling frame from an uplink node, the SN communication section buffers the downlink frame in the downlink buffer in a case where the received polling frame includes the downlink data frame, and in a case where the flag included in the received polling frame indicates uplink, the SN communication section extracts the uplink data frame from the uplink buffer and performs transmission preparation, and in a case where the flag included in the received polling frame indicates downlink, the SN communication section extracts the downlink data frame from the downlink buffer and performs transmission preparation, and the SN communication section generates a new polling frame that includes the uplink data frame or the downlink data frame in a transmission preparation state and a flag, and transmits the polling frame in a state where the plurality of nodes connected in the uplink and downlink directions are allowed to receive the polling frame, and the SN communication section or the CN communication section receives the polling frame from the downlink node, and in a case where the polling frame includes the uplink data frame, the SN communication section buffers the uplink data frame in the uplink buffer, and the CN communication section transfers the uplink data frame toward an Internet link.

A ninth aspect of the invention of the present application is the network system according to any one of the first to the eighth aspects, in which the plurality of nodes perform communication, using one communication interface, or using a plurality of communication interfaces in a bundled manner, and the plurality of nodes allocate an identical channel, and perform communication of uplink and downlink traffic.

A tenth aspect of the invention of the present application is a node transmitting a downlink frame to another node, the node including: a transmission standby time determination section that determines a transmission standby time when the downlink frame is transmitted; and a CN communication section that transmits a next downlink frame to the other node after the transmission standby time elapses after transmission of the downlink frame immediately before the next downlink frame, in which the transmission standby time determination section determines, as the transmission standby time, when the downlink frame is transmitted, a time that is equal to or longer than an additional standby time according to a destination node.

An eleventh aspect of the invention of the present application is a frame transmission method in a network system including a plurality of nodes, the method including transmitting, by the plurality of nodes, uplink and downlink traffic, using a path having a tree structure that includes one root node, a plurality of internal nodes, and a plurality of leaf nodes, in which the root node includes: a transmission standby time determination section that determines a transmission standby time when a downlink frame is transmitted, and a CN communication section that transmits the downlink frame to the plurality of internal nodes and the plurality of leaf nodes; in which the transmission standby time determination section determines, as the transmission standby time, when the downlink frame is transmitted, a time that is equal to or longer than an additional standby time according to a destination node; determining the transmission standby time, by the transmission standby time determination section in a case where the root node transmits the downlink frame; and transmitting the downlink frame, by the CN communication section, after the transmission standby time elapses after transmission of a downlink frame that is immediately before the downlink frame.

A twelfth aspect of the invention of the present application is a program causing a computer to function as the node according to the tenth aspect.

The invention of the present application may be regarded as a computer-readable recording medium where the program according to the twelfth aspect is (routinely) recorded, or a root node according to each aspect.

The invention of the present application may be regarded as the network system including a core node and a plurality of slave nodes in which the core node includes a CN communication section that transmits an indication frame and a downlink data frame to the slave node, the indication frame includes an uplink direction indication frame for designating an uplink, and a downlink direction indication frame for designating a downlink, the slave nodes include an SN communication section that communicates with another node, upon receipt of the uplink direction indication frame, the SN communication section receives the uplink data frame and the downlink data frame and the indication frame in communication until reception of a new downlink direction indication frame, and transmits the uplink data frame and buffers the downlink data frame but does not transmit the downlink data frame, and upon receipt of the downlink direction indication frame, the SN communication section receives the uplink data frame and the downlink data frame and the indication frame in communication until reception of a new downlink direction indication frame and transmits the downlink data frame and buffers the uplink data frame but does not transmit the uplink data frame.

Furthermore, the root node changes a time allocation not only of the time from transmission of the uplink direction indication frame to transmission of the next indication frame and the time from transmission of the downlink direction indication frame to transmission of the next indication frame but also of the time from transmission of the access link indication frame to transmission of the next indication frame, according to the traffic amount and/or the buffer amount.

Advantageous Effects of Invention

According to each aspect of the invention of the present application, in the root node, when the downlink frame is transmitted, the transmission standby time at least the additional standby time different for each destination node is intentionally set. Consequently, communication can be achieved that is resistant to the effects of random backoff, achieves the intermittent periodic transmit forwarding (IPT) at a sufficient period, and has a high efficiency over the entire network. An example of the root node is the core node (the gateway node connected to the backbone link). An example of the internal node and the leaf node is the slave node. IPT that the inventor has proposed provides an absolute transmission period for the source node, and is different from that of the invention of the present application.

According to the second and third aspects of the invention of the present application, addition of the additional standby time determination section can secure the transmission standby time different for each destination, and can set an appropriate transmission standby time required for IPT operation even in a case where IPT is implemented in a wireless module equipped with a quality assurance function on the datalink layer (layer 2) of CSMA/CA or the like.

Furthermore, according to the fourth aspect, the internal nodes and the leaf nodes can be achieved by typical communication apparatuses that adopt CSMA/CA or the like.

Furthermore, according to the fifth aspect, the root node uses the indication frame, thereby allowing the internal nodes and the leaf nodes to transmit and receive data frames to and from the adjacent node on any of the uplink and the downlink. In the case where the uplink is designated, the internal node and the leaf node transmit only the uplink data frame but do not transmit the downlink data frame. In the case where the downlink is designated, the internal node transmits only the downlink data frame but does not transmit the uplink data frame. The root node designates the uplink or the downlink to the internal node or the leaf node, through the indication frame. When the indication frame reaches the leaf node, the path therebetween becomes the uplink or the downlink.

As for reception of the data frame, both the uplink data frame and the downlink data frame are received. Accordingly, even in the case where the adjacent nodes (nodes allowing direct communication on the path) include nodes where the uplink is designated and nodes where the downlink is designated in a mixed manner, the data frame transmitted from these nodes are received. Consequently, the uplink and the downlink are not required to be switched in a synchronized manner over the entire network. The uplink and the downlink may be designated in the units of the paths between the nodes. Accordingly, occurrence of bi-directional collision between the nodes is easily suppressed, while the uplink and downlink traffic can be achieved on the identical relay path.

Communication between the nodes may be wireless communication or wired communication. For example, even in a case where only a single wireless module is included, stable frame transfer on the uplink and downlink can be achieved. Even in a case where multiple wireless modules are included, the modules may be operated in parallel, thereby allowing the load to be distributed.

Furthermore, according to the sixth aspect of the invention of the present application, change in time allocation for the uplink and downlink can effectively utilize the communication resources. Moreover, in a case of access link time allocation, the time allocation may be configured to be changeable.

Furthermore, according to the seventh aspect of the invention of the present application, not only the uplink and the downlink but also the access link (the link between a terminal and a node to which this terminal is directly connected) is switched, thereby allowing the access link and the relay link to reside in a mixed manner. Consequently, for example, a single communication module can communicate not only between the nodes but also with another communication apparatus, thereby communication resources for such as a wireless module, to be effectively utilized.

Furthermore, according to the eighth aspect of the invention of the present application, use of the polling frame allows uplink and downlink traffic to be achieved on the identical relay path. The state where the uplink DF flag is set and the state where this flag is not set respectively mean the state where the downlink DF flag is not set and the state where this flag is set.

Furthermore, according to the ninth aspect of the invention of the present application, for example, even in a case where wireless communication is involved, the same wireless channel is allocated, which can achieve a state allowing mutual communication. Multichannel mesh is achieved by different networks.

According to the background art described in NPL 1, when AP transmits data, the terminal does not transmit data, and when AP does not transmit data, the terminal transmits data. Accordingly, communication over the entire network is required to be controlled in synchronization with AP's data transmission. The terminal does not transmit the downlink data frame. Accordingly, transmission is not controlled in a manner where the uplink data frame and the downlink data frame are discriminated from each other. According to the invention of the present application, transmission and reception of the data frame are separately controlled. The reception is subjected to reception control without discrimination between the uplink data frame and the downlink data frame, while the transmission is subjected to transmission control with discrimination between the uplink data frame and the downlink data frame. Even if the uplink data frame and the downlink data frame simultaneously reach a certain slave node, the slave node can receive both the frames. Accordingly, multiple slave nodes may include nodes where the uplink is designated, and nodes where the downlink is designated, in a mixed manner. The invention of the present application can independently control individual slave nodes, and is essentially different from the technique that controls the entire network in a time division manner as described in NPL 1.

BRIEF DESCRIPTION OF DRAWINGS

FIG. 1 shows an example of a network system according to an embodiment of the invention of the present application;

FIG. 2A is a block diagram showing an example of a configuration of a core node 3 and a slave node 5 in FIG. 1;

FIG. 2B is a block diagram showing an example of the configuration of core node 3 and slave node 5 in FIG. 1;

FIG. 3A is a flowchart showing an example of the operations of core node 3 and slave node 5 in a case where an implicit IPT is used;

FIG. 3B is a flowchart showing the example of the operations of core node 3 and slave node 5 in the case where the implicit IPT is used;

FIG. 3C is a flowchart showing the example of the operations of core node 3 and slave node 5 in the case where the implicit IPT is used;

FIG. 3D is a flowchart showing the example of the operations of core node 3 and slave node 5 in the case where the implicit IPT is used;

FIGS. 10A to 10D are diagrams showing a case of changing the state with the uplink being designated to the state with the downlink being designated in an example of adjacent node;

FIGS. 11A to 11D are diagrams showing a case of changing a state with a downlink being designated to a state with an access link being designated in an example of adjacent node;

DESCRIPTION OF EMBODIMENTS

Figure 4:
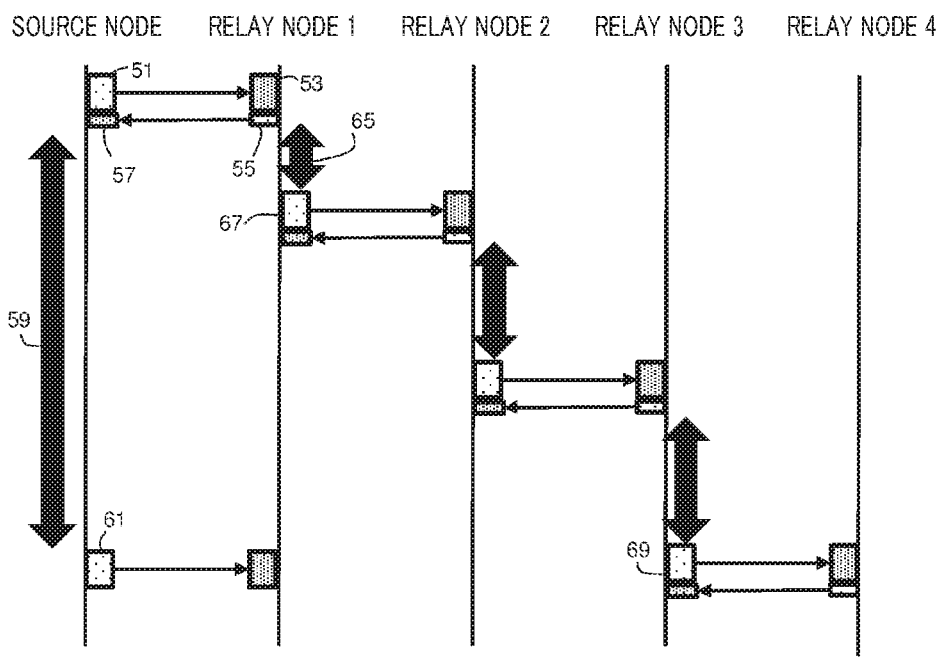
FIG. 4 shows an example of a relay process in a case where no IPT is used.

Hereinafter, referring to the diagrams, embodiments of the invention of the present application are described. Note that the invention of the present application is not limited to the embodiments.

Embodiments

FIG. 1 shows an example of a network system according to an embodiment of the invention of the present application. The network system 1 includes one core node 3, and six slave nodes $5_1, \ldots, 5_6$. Note that suffixes to symbols are sometimes omitted. Hereinafter, a case where each node wirelessly communicates through one wireless module, all the nodes allocate the same wireless channel, and a state of allowing mutual communication is achieved, is described as an example. The invention of the present application may be what uses multiple wireless modules, is wireless communication, or a combination of wired communication and wireless communication. In the case where multiple wireless modules are used, the load can be distributed by parallel operations among the wireless modules, for example.

In the network system 1, tree-structured paths are constructed. Core node 3 (an example of "root node" in claims of the present application) is the root of a tree structure. Slave nodes $5_1$ and $5_2$ (examples of "internal nodes" in claims of the present application) are in the tree structure. Slave nodes $5_3$, $5_4$, $5_5$ and $5_6$ (examples of "leaf nodes" in claims of the present application) are leaves of the tree structure. The children of core node 3 are slave nodes $5_1$ and $5_2$. The children of slave node $5_1$ are slave nodes $5_3$, $5_4$ and $5_5$. The child of slave node $5_2$ is slave node $5_6$.

An adjacent node is a node that can directly communicate in the path constructed in the network. For example, the adjacent nodes of slave node $5_2$ are core node 3 and slave node $5_6$.

The uplink is a link from the slave node to the core node along the path of the tree structure constructed in the network. For example, the uplink of slave node $5_3$ is a link toward parent slave node $5_1$. An uplink node is a node at a position in a direction toward the core node, among the adjacent nodes. This node is the parent node on the path of the tree structure. For example, the uplink node of slave node $5_6$ is slave node $5_2$.

The downlink is a link from the core node to the slave node along the path constructed in the network. An uplink frame is a frame on the uplink. A downlink frame is a frame on the downlink. A downlink node is a node at a position in a direction away from the core node, among the adjacent nodes. This node is the child node on the path of the tree structure. For example, the downlink node of slave node $5_2$ is slave node $5_6$.

A data frame is a frame for transmitting data. An uplink data frame is an uplink frame for transmitting data. A downlink data frame is a downlink frame for transmitting data. An indication frame is for allowing the core node to indicate the uplink, the downlink, and the access link, for the slave node. Here, the uplink and the downlink are trunk links (backbone links), and are for communication between the nodes. The access link is for communication between the node and a mobile terminal or the like. This embodiment can instruct each node to function as the access link. Consequently, for example, a wireless communication apparatus for the backbone link can also be used for the access link.

A path control for constructing the path can be constructed by minimum propagation loss routing or the like in a manner analogous to that described in PTL 1 and Japanese Patent No. 4496336. The invention of the present application relates to frame transfer after path construction.

FIGS. 2A and 2B are block diagrams showing an example of the configuration of core node 3 and slave node 5 in FIG. 1. Referring to FIGS. 2A and 2B, the example of the configuration of core node 3 and slave node 5 is described.

Referring to FIG. 2A, core node 3 includes CN control section 11 that controls the operation of core node 3, CN communication buffer 13 that stores frames, and CN communication section 15 that communicates with another node. CN communication section 15 includes CN quality assurance time determination section 17 that determines a quality assurance time, additional standby time determination section 19 that determines an additional standby time, CN transmission section 21 that transmits a frame to another node, and CN reception section 23 that receives a frame from another node.

Core node 3 is achieved by multiple layers. CN quality assurance time determination section 17 adds the quality assurance time through the operation of MAC (CSMA/CA on layer 2), for example. CN additional standby time determination section 19 adds the additional standby time on 2.5 layer through the IPT protocol, for example. From the standpoint of a designer of core node 3, the quality assurance time seems to be added "automatically" while the additional standby time seems to be added "intentionally".

Referring to FIG. 2B, slave node 5 includes SN control section 25 that controls the operation of slave node 5, SN communication buffer 27 that stores frames, and SN communication section 29 that communicates with another node. SN communication buffer 27 includes SN uplink buffer 37, and SN downlink buffer 39. SN communication section 29 includes SN quality assurance time determination section 31 that determines a quality assurance time, SN transmission section 33 that transmits a frame to another node, and SN reception section 35 that receives a frame from another node.

Slave node 5 is achieved by multiple layers in a manner analogous to that of core node 3. SN quality assurance time determination section 31 adds the quality assurance time through, for example, the operation of MAC in a manner analogous to that of CN quality assurance time determination section 17.

FIGS. 3A to 3D are flowcharts showing an example of the operations of core node 3 and slave node 5 in the case where the implicit IPT is used.

Referring to FIGS. 3A and 3B, the example of the operation of core node 3 is described. Referring to FIG. 3A, an example of the operation during frame transmission is described. CN additional standby time determination section 19 calculates the additional standby time according to a destination node (step STCS1). Typically, the additional standby time tends to increase with increase in the number of hops. However, the invention of the present application is not limited to such a magnitude relationship. CN transmission section 15 determines whether to transmit the downlink frame or not (step STCS2). The frame to be transmitted is stored in the CN communication buffer. If transmission is not scheduled, standby is made until transmission. If transmission is scheduled, CN quality assurance time determination section 17 calculates the quality assurance time (step STCS3). The quality assurance time is a time to be added for preventing multiple communication apparatuses from simultaneously performing transmission, in the same manner as that to be added in CSMA/CA, for example. Typically, the time is a random standby time. CN control section 11 determines whether the transmission standby time that is the sum of the quality assurance time and the additional standby time has elapsed or not (step STCS4). If the time has not elapsed, this control section stands by until the elapse. If the time has elapsed, this control section transmits the frame (step STCS5), and the processing returns to step STCS2.

To make the transmission standby time at least the additional standby time, the time is secured by another process, for example, redetermination for making the time at least the additional standby time if the obtained quality assurance time is less than the additional standby time. Accordingly, IPT can be achieved at an interval of at least the additional standby time.

Typically, in a case where a source node (core node 3 or the like in FIG. 1) is specifically achieved, the minimum IPT period is automatically set if the wireless IF adopts CSMA. However, this is for avoiding simultaneous transmission and the like between the adjacent nodes, and cannot prevent interference on the path at a position remote from the source node. The implicit IPT can prevent interference on the path at the remote position by adding the additional standby time according to the destination node even if the source node adds CSMA.

Referring to FIG. 3B, an example of the operation during frame reception is described. CN reception section 23 repeats the operation of receiving the frame having been transmitted from another node (step STCR1). CN reception section 23 always performs the reception process.

Referring to FIGS. 3C and 3D, the example of the operation of slave node 5 is described. Referring to FIG. 3C, an example of the operation during frame transmission is described. SN transmission section 29 determines whether to transmit the downlink frame or not (step STSS1). The frame to be transmitted is stored in the SN communication buffer. If transmission is not scheduled, standby is made until transmission. If transmission is scheduled, SN quality assurance time determination section 31 calculates the quality assurance time (step STSS2). The operation of SN quality assurance time determination section 31 is analogous to that of CN quality assurance time determination section 17. SN control section 25 determines whether the quality assurance time has elapsed or not (step STSS3). If the time has not elapsed, this control section stands by until the elapse. If the time has elapsed, this control section transmits the frame (step STSS4), and the processing returns to step STSS1.

In slave node 5, the process of determining the quality assurance time by the quality assurance time determination section 17 may be turned off. This case can be achieved, in FIG. 3C, by the same process as that in the case without the quality assurance time.

Referring to FIG. 3D, an example of the operation during frame reception is described. SN reception section 35 repeats the operation of receiving the frame having been transmitted from another node (step STSR1). SN reception section 35 always performs the reception process.

Figure 5:
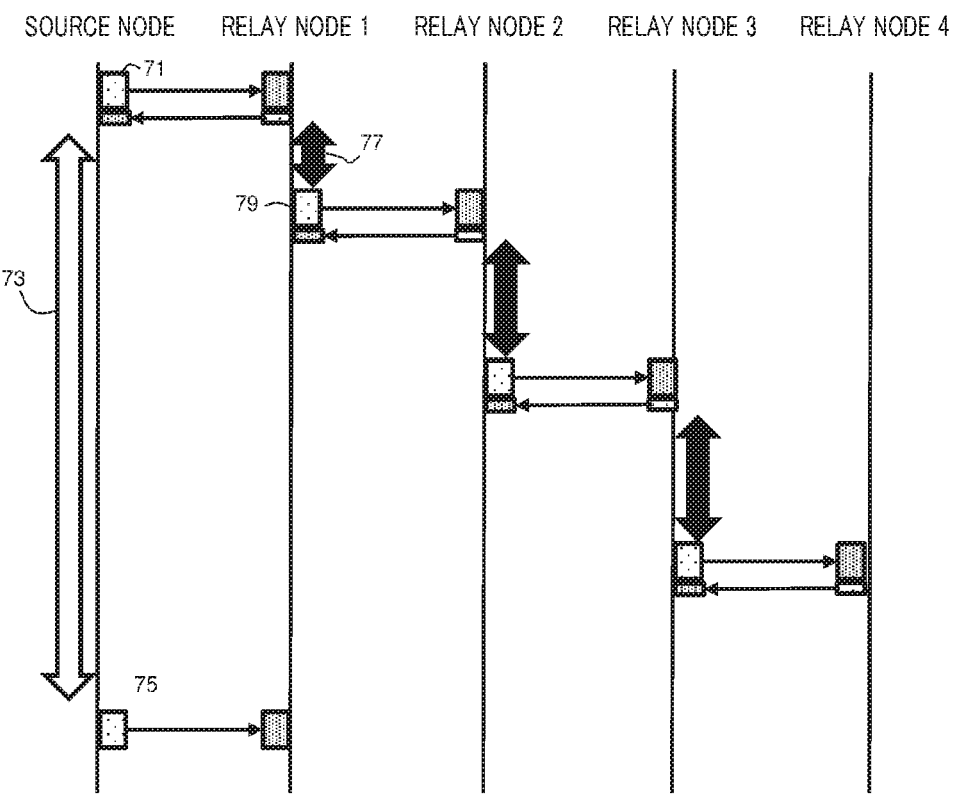
FIG. 5 shows an example in a case where a conventional IPT is simply used.
Figure 6:
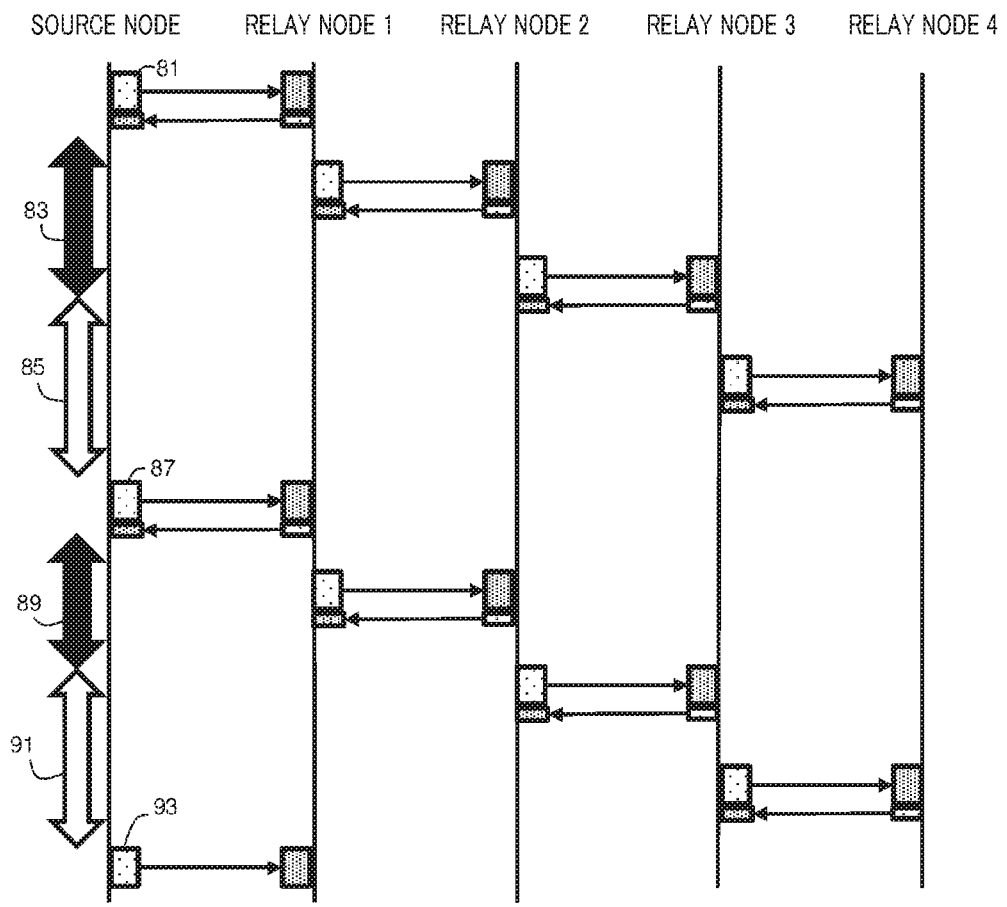
FIG. 6 shows an example in a case where an implicit IPT is used.

Referring to FIGS. 4, 5 and 6, the technical meaning of the implicit IPT is specifically described. The time elapses downwards from the upper position. A relay node corresponds to the core node. A relay node corresponds to the slave node. Relay node 3 and relay node 1 are assumed to be in an interference reachable range. Accordingly, it is assumed that at the timing when relay node 3 performs transmission to relay node 4, transmission from the source node to relay node 1 fails by radio wave interference. The downlink data frame transmitted from the source node sequentially passes through relay nodes 1, 2 and 3 and reaches relay node 4. FIG. 4 shows an example in a case where no IPT is used. FIG. 5 shows a case where a conventional IPT is simply used. FIG. 6 shows a case where the implicit IPT is used.

Referring to FIG. 4, problems in the case without application of IPT are described. The source node transmits data frame 51 to relay node 1. Relay node 1 receives data frame 53. Relay node 1 transmits ACK 55 to the source node. The source node receives ACK 57. The source node stands by for random quality assurance time 59 according to the CSMA protocol. After the elapse of the quality assurance time, next data frame 61 is transmitted. Relay node 1 stands by for random quality assurance time 65 according to the CSMA protocol, and transfers data frame 67 to relay node 2. Relay node 2 stands by for the quality assurance time and then performs transfer to relay node 3. At the timing when relay node 3 performs transmission to relay node 4, transmission from the source node to relay node 1 fails by radio wave interference. The quality assurance time is randomly added in order to avoid simultaneous transmission. Consequently, in a case of relaying, transmission sometimes fails by radio wave interference.

Referring to FIG. 5, the case with application of IPT is described. The source node provides a fixed transmission period (IPT period). The source node transmits data frame 71 to relay node 1. After elapse of the IPT period, next data frame 75 is transmitted. After elapse of random quality assurance time 77, relay node 1 transfers data frame 79 to relay node 2. Likewise, the data frame is transferred in an order of relay nodes 2, 3 and 4 after elapse of a random time. In a case where the IPT is simply applied, a long IPT period is required for CSMA/CA random backoff in the relay node.

Referring to FIG. 6, a case with application of implicit IPT is described. The source node transmits data frame 81, and subsequently, after elapse of quality assurance time 83 and additional standby time 85 added thereto, the source node transmits next data frame 87. After elapse of quality assurance time 89 and additional standby time 91, the source node transmits next data frame 93. The quality assurance time is randomly and automatically added. On the other hand, the additional standby time is defined according to the destination (relay node 4) node. Accordingly, it is resistant to the adverse effects of the random backoff, and more efficient IPT can be achieved.

As described above, the implicit IPT can achieve IPT in a state where this function is held even in the system that uses the CSMA protocol. Accordingly, IPT can be achieved only by changing software or the like of a wireless apparatus that adopts typical CSMA/CA or the like.

Subsequently, referring to FIGS. 7A to 11D, the time division method using an indication frame is described. FIGS. 7A to 7D are flowcharts showing an example of the operations of core node 3 and slave node 5. Referring to FIGS. 7A to 7D, the example of the operations of core node 3 and slave node 5 is described.

Figure 7A:
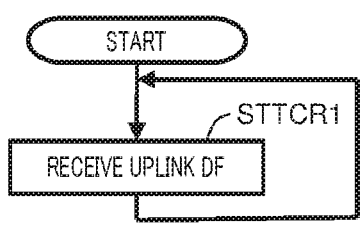
FIG. 7A is a flowchart showing an example of the operations of core node 3 and slave node 5 with respect to a time division method using an indication frame.
Figure 7C:
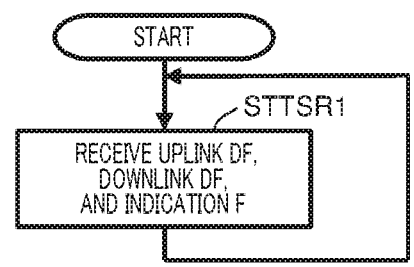
FIG. 7C is a flowchart showing the example of the operations of core node 3 and slave node 5 with respect to the time division method using the indication frame.
Figure 7B:
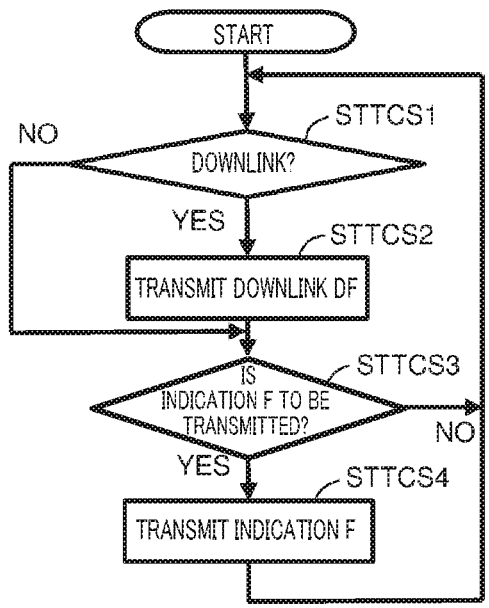
FIG. 7B is a flowchart showing the example of the operations of core node 3 and slave node 5 with respect to the time division method using the indication frame.

Referring to FIGS. 7A and 7B, the example of the operations of core node 3 is described. FIG. 7A shows the operation of core node 3 during reception. CN reception section 23 receives an uplink data frame from a downlink slave node (step STTCR1). CN reception section 23 always receives the data frame.

FIG. 7B shows the operation of core node 3 during transmission. CN control section 11 determines whether the downlink is designated or not (step STTCS1). If no designation is made, the downlink data frame is not transmitted and the processing proceeds to step STTCS3. If the downlink is designated, the downlink data frame is transmitted (step STTCS2), and the processing proceeds to step STTCS3. In step STTCS3, it is determined whether the indication frame is transmitted or not. If the indication frame is to be transmitted, the indication frame is transmitted to slave node 5 (step STTCS4), and the processing returns to step STTCS1. If the indication frame is not to be transmitted, the processing returns to STTCS1.

The indication frames include a downlink direction indication frame that designates the downlink, an uplink direction indication frame that designates the uplink, and an access link indication frame that designates the access link. Core node 3 adaptively adjusts the time allocation of the uplink, the downlink, and the access link. For example, the uplink and downlink are adjusted as follows. For example, in the initial state, the allocation of the uplink and downlink are 1:1. According to the traffic amount and/or buffer amount, the ratio allocation of the uplink and downlink is changed. The traffic amount is measured by the link utilization rates of the uplink and downlink, for example. The buffer amount is measured by the buffer amount of the data frames on the uplink and downlink, for example. The time allocation of the access link and the uplink and downlink is adjusted by grasping the data amount from the traffic amount and/or buffer amount on the uplink and downlink.

Figure 7D:
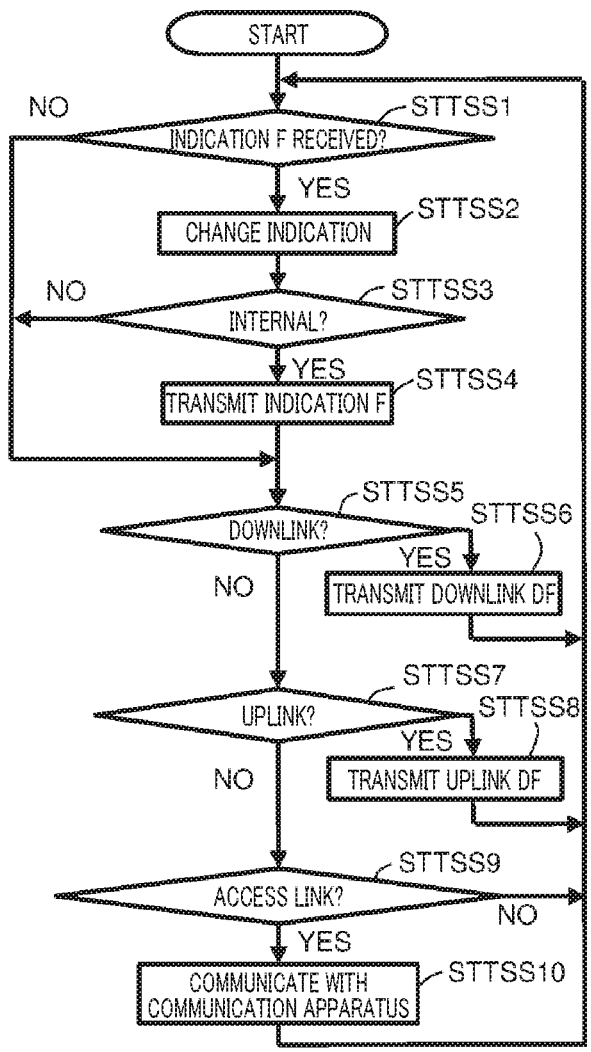
FIG. 7D is a flowchart showing the example of the operations of core node 3 and slave node 5 with respect to the time division method using the indication frame.

Referring to FIGS. 7C and 7D, the example of the operation of slave node 5 is described. FIG. 7C shows the operation of slave node 5 during reception. SN reception section 35 receives the uplink data frame and the downlink data frame, and the indication frame, from the adjacent node (step STTSR1). When the received frame is to be transferred, the frame is stored in SN communication buffer 27. SN reception section 35 always receives the data frame and the indication frame.

FIG. 7D shows the operation of slave node 5 during transmission. SN control section 25 determines whether the indication frame has been received or not (step STTSS1). If the indication frame has not been received, the processing returns to STTSS5. When the indication frame has been received, it is configured such that the operation designated by the indication frame is to be performed (step STTSS2), and the processing proceeds to step STTSS3. Upon receipt of the downlink direction indication frame, the downlink data frame is transmitted, and the uplink data frame is stored in SN communication buffer 27 and is not transmitted. Upon receipt of the uplink direction indication frame, the uplink data frame is transmitted, and the downlink data frame is stored in the SN communication buffer 27 and is not transmitted. Upon receipt of the access link indication frame, communication between nodes is not performed, and communication with a communication apparatus (e.g., a smartphone etc.), not shown, is performed instead. Accordingly, slave node 5 can function as an access point. Accordingly, the time is divided into three, and the uplink, the downlink, and the access link are switched. Even if one wireless module is provided, the access link and the relay link can be mixed, and the wireless module can be effectively utilized.

In step STTSS3, SN control section 25 determines whether slave node 5 is internal or not. If the node is not internal (i.e., a leaf), the processing proceeds to STTSS6. If the node is internal, the indication frame is transferred (step STTSS4) and the processing proceeds to step STTSS5.

In step STTSS5, it is determined whether the downlink is designated or not. If the downlink is designated, SN transmission section 33 transmits the downlink data frame, and buffers the uplink data frame in SN communication buffer 23 but does not transmit the uplink data frame (step STTSS6), and the processing returns to step STTSS1. If the downlink is not designated, it is determined whether the uplink is designated or not (step STTSS7). If the uplink is designated, transmission section 33 transmits the uplink data frame, and buffers the downlink data frame in SN communication buffer 23 but does not transmit the downlink data frame (step STTSS5), and the processing returns to step STTSS1. If the uplink is not designated, it is determined whether the access link is designated or not (step STTSS5). If the access link is not designated, the processing returns to step STTSS1. If the access link is designated, SN communication section 29 communicates with a communication apparatus, such as a smartphone (step STTSS10), and the processing returns to step STTSS1.

Figure 8A:
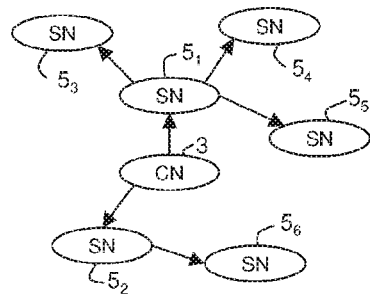
FIGS. 8A to 8D are diagrams showing an example of the operations according to the processes in FIGS. 7A to 7D in the network system 1 in FIG. 1.
Figure 8B:
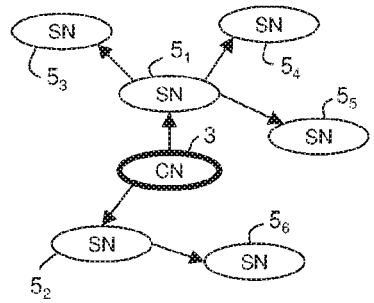
Figure 8C:
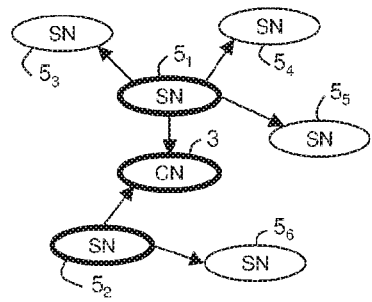
Figure 8D:
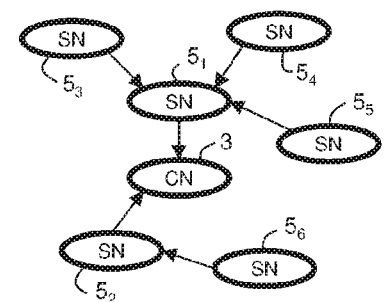

FIGS. 8A to 8D are diagrams showing an example of the operations in the network system 1 in FIG. 1. In FIG. 8A, the downlink is designated over the entire network. In FIG. 8B, core node 3 transmits the uplink direction indication frame to slave nodes $5_1$ and $5_2$ in order to designate the uplink. In FIG. 8C, slave nodes $5_1$ and $5_2$ having received the uplink direction indication frame come into a state where the uplink is designated. Slave nodes $5_1$ and $5_2$ transfer the uplink direction indication frame. In FIG. 8D, the uplink is designated over the entire network.

Referring to FIGS. 9A to 11D, the operations in the adjacent node are specifically described. Slave node 33 has a parent node that is slave node 31, and child nodes that are slave nodes $35_1$ and $35_2$. FIGS. 9A to 9D show a case of changing the state with the downlink being designated to the state with the uplink being designated. FIGS. 10A to 10D show a case of changing the state with the uplink being designated to the state with the downlink being designated. FIGS. 11A to 11D show a case of changing the state with the downlink being designated to the state with the access link being designated.

Figure 9A:
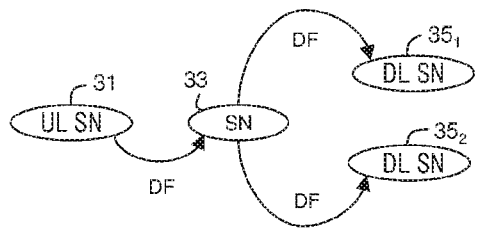
FIGS. 9A to 9D are diagrams showing a case of changing a state with a downlink being designated to a state with an uplink being designated in an example of adjacent node.
Figure 9B:
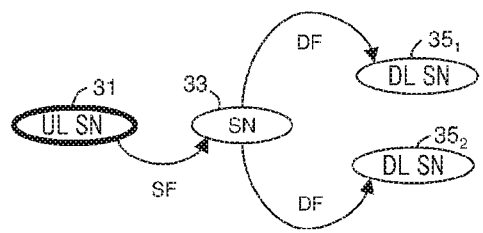
Figure 9C:
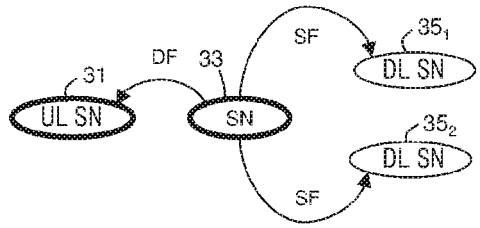
Figure 9D:
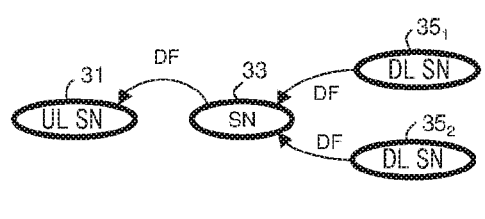

Referring to FIGS. 9A to 9D, in FIG. 9A, the downlink is designated over the entirety. In FIG. 9B, slave node 31 receives the uplink direction indication frame and comes into the state with the uplink being designated, and transfers the uplink direction indication frame to slave node 33. In FIG. 9C, slave node 33 comes into the state with the uplink being designated, and transfers the uplink direction indication frame to slave nodes $35_1$ and $35_2$. In FIG. 9D, the uplink is designated over the entirety.

Referring to FIGS. 10A to 10D, in FIG. 10A, the uplink is designated over the entirety. In FIG. 10B, slave node 31 receives the downlink direction indication frame, and comes into the state with the downlink being designated. In FIG. 10C, the indication frame is transferred. In FIG. 10D, slave node 33 comes into the state with the downlink being designated, and transfers the indication frame to slave nodes $35_1$ and $35_2$. Slave node 352 receives the indication frame, and comes into the state with the downlink being designated. Slave node 351 also receives the indication frame, and comes into the state with the downlink being designated. Accordingly, the downlink is designated over the entirety.

Referring to FIGS. 11A to 11D, in FIG. 11A, the downlink is designated over the entirety. In FIG. 11B, slave node 31 receives the access link indication frame and comes into the state with the access link being designated, and transfers the access link indication frame to slave node 33. In FIG. 11C, slave node 33 comes into the state with the access link being designated, and transfers the access link indication frame to slave nodes $35_1$ and $35_2$. In FIG. 11D, the access link is designated over the entirety.

In this embodiment, the example including the access link indication frame in the indication frame is described. Alternatively, only the uplink and downlink may be designated.

Figure 12A:
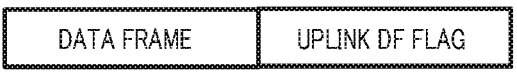
FIG. 12A is a flowchart showing an example of the operation of the slave node 5 in a case of using a polling frame.

Subsequently, referring to FIGS. 12A to 12D, an embodiment using a polling frame is described. FIG. 12A shows an example of the polling frame. The polling frame includes the data frame and an uplink DF flag. The uplink DF flag indicates the uplink data frame with its set state, while indicating the downlink data frame with its reset state. The uplink polling frame is a polling frame that includes an uplink data frame. The downlink polling frame is a polling frame that includes a downlink data frame. The polling frame is a multicast frame. The frame transmitted by a certain node can be simultaneously received by a node in the uplink direction and a node in the downlink direction.

Figure 12B:
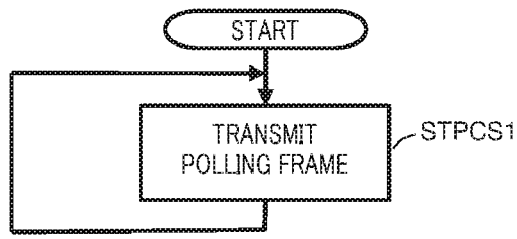
FIG. 12B is a flowchart showing the example of the operation of the slave node 5 in the case of using the polling frame.
Figure 12C:
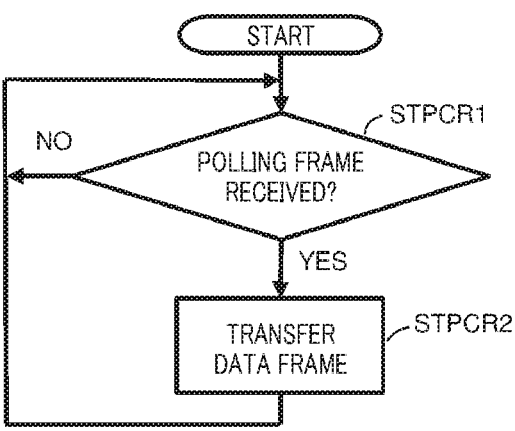
FIG. 12C is a flowchart showing the example of the operation of the slave node 5 in the case of using the polling frame.

FIG. 12B is a flowchart showing an example of the operation by core node 3 transmitting the polling frame. CN communication section 15 transmits a polling frame to the downlink node (step STPCS1). At this time, even if the quality assurance time is secured as with the case in FIG. 3A, transmission may be made at intermittent transmission periods as with the conventional IPT. FIG. 12C is a flowchart showing an example of the operation by core node 3 receiving the polling frame. CN communication section 15 determines whether the polling frame has been received from the downlink node or not (step STPCR1). If the polling frame has not been received yet, this communicator stands by for reception. If the polling frame is received and the polling frame includes the uplink data frame, the frame is transferred to the Internet link (step STPCR2), and the processing returns to step STPCR1.

Figure 12D:
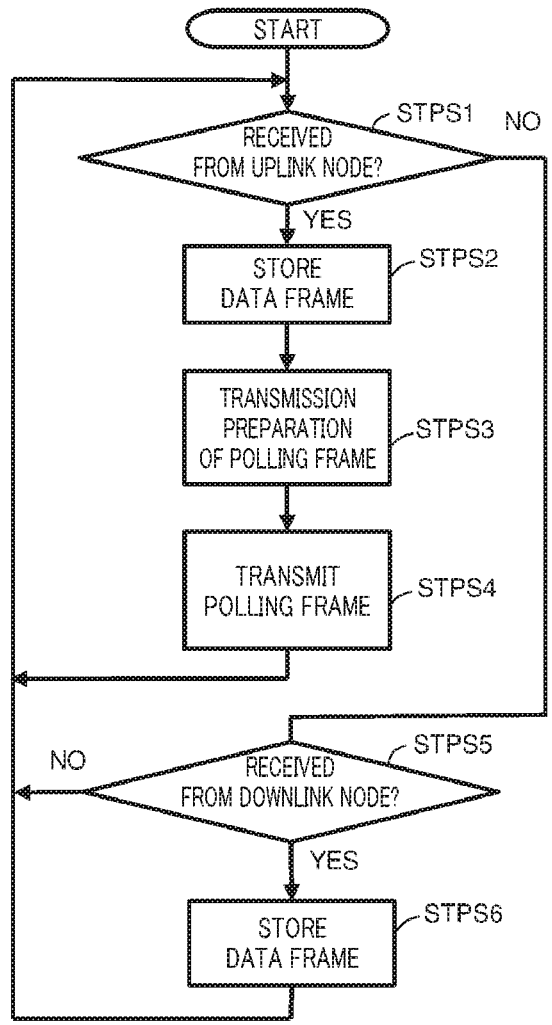
FIG. 12D is a flowchart showing the example of the operation of the slave node 5 in the case of using the polling frame.

FIG. 12D is a flowchart showing a process of transmitting and receiving the polling frame in slave node 5 during polling control. Each slave node 5 stores the uplink data frame in uplink buffer 37, and stores the downlink data frame in downlink buffer 39. These data frames are, for example, a frame received from an apparatus, such as a smartphone, while slave node 5 functions as an access point, and a frame received from another node. Slave node 5 determines whether the polling frame has been received from the uplink node or not (step STPS1). If the polling frame has not been received, the processing returns to STPS5. If the polling frame has been received, the uplink data frame or the downlink data frame included in the polling frame is stored in uplink buffer 37 or downlink buffer 39 (step STPS2). According to the state of the flag included in the received polling frame, the uplink data frame or the downlink data frame stored in uplink buffer 37 or downlink buffer 39 is brought into a transmission preparation state (step STPS3). For example, in a state where the uplink DF flag is set, the uplink data frame is brought into the transmission preparation state. In a state where the uplink DF flag is not set, the downlink data frame is brought into the transmission preparation state. A new polling frame that includes a data frame in a transmission state and a flag is generated, and the polling frame is transmitted in a state of allowing multiple nodes connected in the uplink and downlink directions to receive the polling frame (step STPS4). The flag included in the new polling frame may be the received uplink DF flag as it is, or may be changed. The processing then returns to step STPS1. If the polling frame has not been received in step STPS1, it is determined whether or not the polling frame has been received from the downlink node in step STPS5. If the polling frame has not been received from the downlink node, the processing returns to step STPS1. If the polling frame has been received from the downlink node, the data frame is buffered (step STPS6). For example, if the uplink data frame is included, the frame is stored in the uplink buffer. The processing then returns to step STPS1.

REFERENCE SIGNS LIST

1 Network system
3 Core node
5 Slave node
11 CN control section
13 CN communication buffer
15 CN communication section
17 CN quality assurance time determination section
19 CN additional standby time determination section
21 CN transmission section
23 CN reception section
25 SN control section
27 SN communication buffer
29 SN communication section
31 SN quality assurance time determination section
33 SN transmission section
35 SN reception section

The invention claimed is:

1. A network system, comprising:
a plurality of nodes, wherein the plurality of nodes transmit uplink and downlink traffic, using a path having a tree structure that includes one root node, a plurality of internal nodes, and a plurality of leaf nodes,
wherein the root node comprises:
a core node (CN) communication section that transmits a first downlink data frame to a destination node among the plurality of internal nodes and the plurality of leaf nodes; and
a transmission standby time determination section that determines a transmission standby time when the first downlink data frame is transmitted,
wherein:
the transmission standby time determination section determines the transmission standby time that is equal to or longer than an additional standby time, the additional standby time being determined depending on each destination node,
wherein
the transmission standby time determination section comprises:
a quality assurance time determination section that determines a quality assurance time for securing a communication quality with a next relay destination node when each of the downlink data frames is transmitted;
in a case where the root node transmits the first downlink data frame,
the transmission standby time determination section determines the transmission standby time, and
the CN communication section transmits the first downlink data frame after the quality assurance time and the additional standby time elapses from a transmission timing of a second downlink data frame, the second downlink data frame being transmitted before the first downlink data frame.

2. The network system according to claim 1, wherein the root node is achieved by a plurality of layers,
the quality assurance time determination section determines, as the quality assurance time, a time for securing the communication quality with the next relay destination node on a first layer, and
the additional standby time determination section determines, as the additional standby time, a time to be added for securing the communication quality to a final relay destination node on a second layer that is different from the first layer.

3. The network system according to claim 1, wherein the plurality of nodes perform communication, using one communication interface, or using a plurality of communication interfaces in a bundled manner, and
the plurality of nodes allocate an identical channel, and perform communication of uplink and downlink traffic.

4. A network system, comprising:
a plurality of nodes, wherein the plurality of nodes transmit uplink and downlink traffic, using a path having a tree structure that includes one root node, a plurality of internal nodes, and a plurality of leaf nodes, wherein the root node comprises:
  a core node (CN) communication section that transmits a first downlink data frame to a destination node among the plurality of internal nodes and the plurality of leaf nodes; and
  a transmission standby time determination section that determines a transmission standby time when the first downlink data frame is transmitted,
wherein:
the transmission standby time determination section determines the transmission standby time that is equal to or longer than an additional standby time, the additional standby time being determined depending on each destination node,
in a case where the root node transmits the first downlink data frame,
  the transmission standby time determination section determines the transmission standby time, and
  the CN communication section transmits the first downlink data frame after the transmission standby time elapses from a transmission timing of a second downlink data frame, the second downlink data frame being transmitted before the first downlink data frame, and
wherein
the plurality of internal nodes and the plurality of leaf nodes comprise:
an slave node (SN) quality assurance time determination section that determines a quality assurance time for securing the communication quality with a next relay destination node during transmission of a frame; and
an SN communication section that transmits a next frame after the quality assurance time elapses after transmission of a frame that is immediately before the next frame.

5. A network system, comprising:
a plurality of nodes, wherein the plurality of nodes transmit uplink and downlink traffic, using a path having a tree structure that includes one root node, a plurality of internal nodes, and a plurality of leaf nodes, wherein the root node comprises:
  a core node (CN) communication section that transmits a first downlink data frame to a destination node among the plurality of internal nodes and the plurality of leaf nodes; and
  a transmission standby time determination section that determines a transmission standby time when the first downlink data frame is transmitted,
wherein:
the transmission standby time determination section determines the transmission standby time that is equal to or longer than an additional standby time, the additional standby time being determined depending on each destination node,
in a case where the root node transmits the first downlink data frame,
  the transmission standby time determination section determines the transmission standby time, and
  the CN communication section transmits the first downlink data frame after the transmission standby time elapses from a transmission timing of a second downlink data frame, the second downlink data frame being transmitted before the first downlink data frame, and
wherein
the root node transmits an indication frame to the plurality of internal nodes and the plurality of leaf nodes along the path,
the indication frame includes: an uplink direction indication frame for designating an uplink; and a downlink direction indication frame for designating a downlink, and
the plurality of internal nodes and the plurality of leaf nodes comprise an slave node (SN) communication section that communicates with another node, wherein
upon receipt of the uplink direction indication frame, in a case of the plurality of internal nodes, the SN communication section transfers the uplink direction indication frame in a downlink direction, and during communication until receipt of a new indication frame other than the uplink direction indication frame, the SN communication section receives the uplink data frame and the downlink data frame, and the indication frame, and transmits the uplink data frame and buffers the downlink data frame without transmitting the downlink data frame, and
upon receipt of the downlink direction indication frame, in the case of the plurality of internal nodes, the SN communication section transfers the downlink direction indication frame in the downlink direction, and during communication until receipt of a new indication frame other than the downlink direction indication frame, the SN communication section receives the uplink data frame and the downlink data frame, and the indication frame, and transmits the downlink data frame and buffers the uplink data frame without transmitting the uplink data frame.

6. The network system according to claim 5, wherein the root node changes, according to a traffic amount and/or a buffer amount, a time allocation of a time from transmission of the uplink direction indication frame to transmission of a next indication frame and a time from transmission of the downlink direction indication frame to transmission of a next indication frame.

7. The network system according to claim 5, wherein the indication frame further includes an access link indication frame, wherein
  upon receipt of the access link indication frame, during communication until reception of a new indication frame other than the access link indication frame, in the case of the plurality of internal nodes, the SN communication section transfers the access link indication frame in the downlink direction, and receives the uplink data frame and the downlink data frame, and the indication frame, communicates with a communication apparatus other than the plurality of nodes, and buffers the downlink data frame and the uplink data frame without transmitting these buffered frames.

8. A network system comprising:
a plurality of nodes, wherein the plurality of nodes transmit uplink and downlink traffic, using a path having a tree structure that includes one root node, a plurality of internal nodes, and a plurality of leaf nodes, wherein the root node comprises:
  a core node (CN) communication section that transmits a first downlink data frame to a destination node among the plurality of internal nodes and the plurality of leaf nodes; and
  a transmission standby time determination section that determines a transmission standby time when the first downlink data frame is transmitted, wherein:
the transmission standby time determination section determines the transmission standby time that is equal to or longer than an additional standby time, the additional standby time being determined depending on each destination node,
in a case where the root node transmits the first downlink data frame,
the transmission standby time determination section determines the transmission standby time, and
the CN communication section transmits the first downlink data frame after the transmission standby time elapses from a transmission timing of a second downlink data frame, the second downlink data frame being transmitted before the first downlink data frame, and
wherein
the plurality of internal nodes comprise an SN communication section that transmits a polling frame to another node, wherein
the SN communication section comprises an uplink buffer and a downlink buffer, and
the polling frame includes an uplink data frame or a downlink data frame, and a flag indicating uplink or downlink, wherein
the CN communication section included in the root node transmits the polling frame to a downlink node;
upon receipt of the polling frame from an uplink node, the SN communication section buffers the downlink frame in the downlink buffer in a case where the received polling frame includes the downlink data frame, and
in a case where the flag included in the received polling frame indicates uplink, the SN communication section extracts the uplink data frame from the uplink buffer and performs transmission preparation, and
in a case where the flag included in the received polling frame indicates downlink, the SN communication section extracts the downlink data frame from the downlink buffer and performs transmission preparation, and
the SN communication section generates a new polling frame that includes the uplink data frame or the downlink data frame in a transmission preparation state and a flag, and transmits the polling frame in a state where the plurality of nodes connected in the uplink and downlink directions are allowed to receive the polling frame, and
the SN communication section or the CN communication section receives the polling frame from the downlink node, and in a case where the polling frame includes the uplink data frame,
the SN communication section buffers the uplink data frame in the uplink buffer, and the CN communication section transfers the uplink data frame toward an Internet link.

9. A node comprising:
a transmission standby time determination section that determines a transmission standby time; and
a core node (CN) communication section that transmits a first downlink data frame to a destination node after the transmission standby time elapses from a transmission timing of a second downlink data frame, the second downlink data frame being transmitted before the first downlink data frame, wherein
the transmission standby time determination section determines the transmission standby time that is equal to or longer than an additional standby time, the additional standby time being determined depending on a destination node, and
wherein
the transmission standby time determination section comprises:
a quality assurance time determination section that determines a quality assurance time for securing a communication quality with a next relay destination node when each of the downlink data frames is transmitted; wherein
the CN communication section transmits the first downlink data frame after the quality assurance time and the additional standby time elapse from the transmission timing of the second downlink data frame.

10. A non-transitory computer-readable recording medium recording a program causing a computer to function as the node according to claim 9.

11. A frame transmission method in a network system including a plurality of nodes, the method comprising:
wherein the plurality of nodes transmit uplink and downlink traffic, using a path having a tree structure that includes one root node, a plurality of internal nodes, and a plurality of leaf nodes,
determining a quality assurance time for securing a communication quality with a next relay destination node when each of the downlink data frames is transmitted,
determining an additional standby time, the additional standby time being determined depending on a destination node among the plurality of internal nodes and the plurality of leaf nodes, and;
transmitting, to the destination node, a first downlink data frame after the quality assurance time and the additional standby time elapses from a transmission timing of a second downlink data frame, the second downlink data frame being transmitted before the first downlink data frame.

* * * * *